Nov. 12, 1935.　　　　　E. R. FROST　　　　2,020,658
MACHINE AND METHOD FOR MANUFACTURING BOLTS
Filed Oct. 22, 1932　　　　6 Sheets-Sheet 1
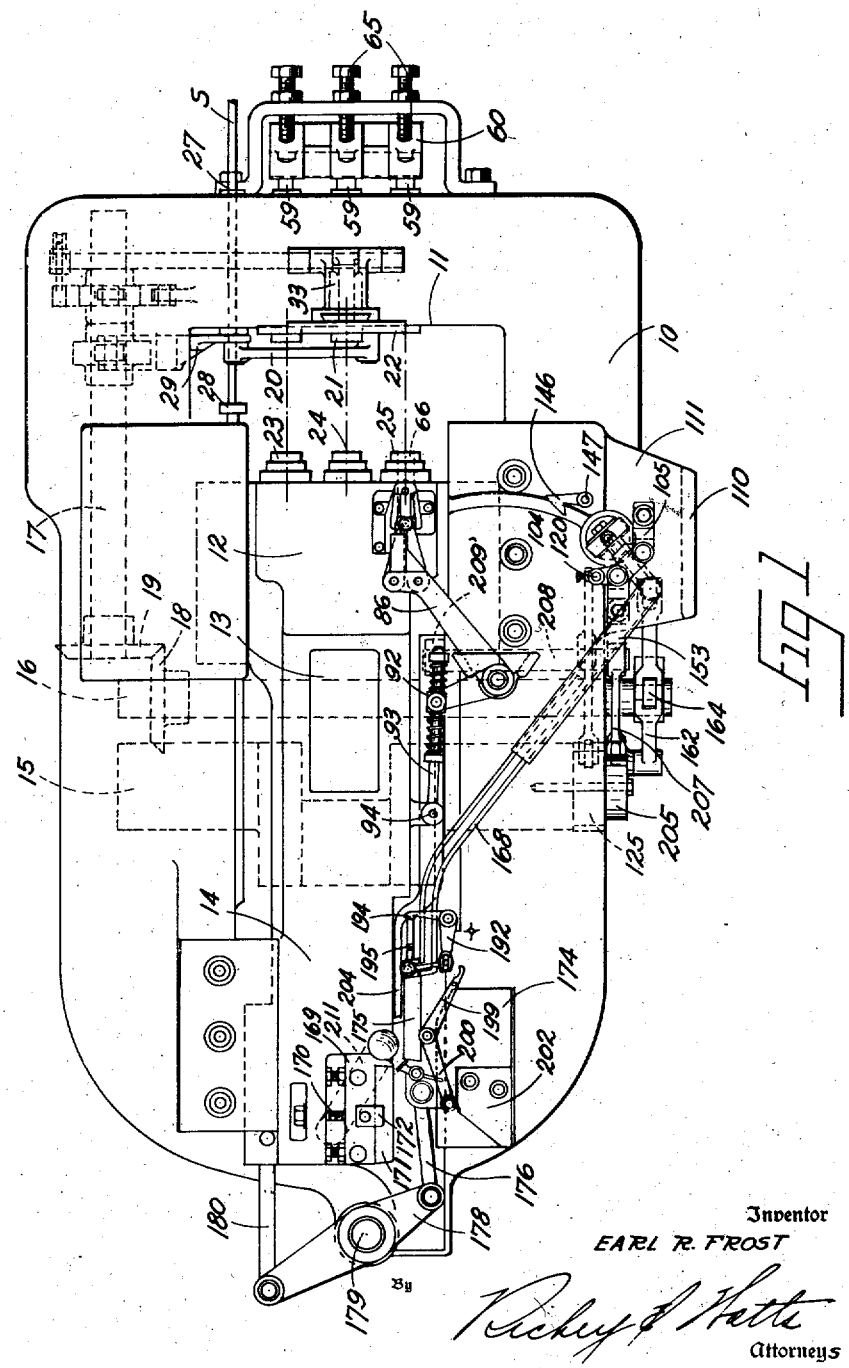
Inventor
EARL R. FROST
By
Attorneys

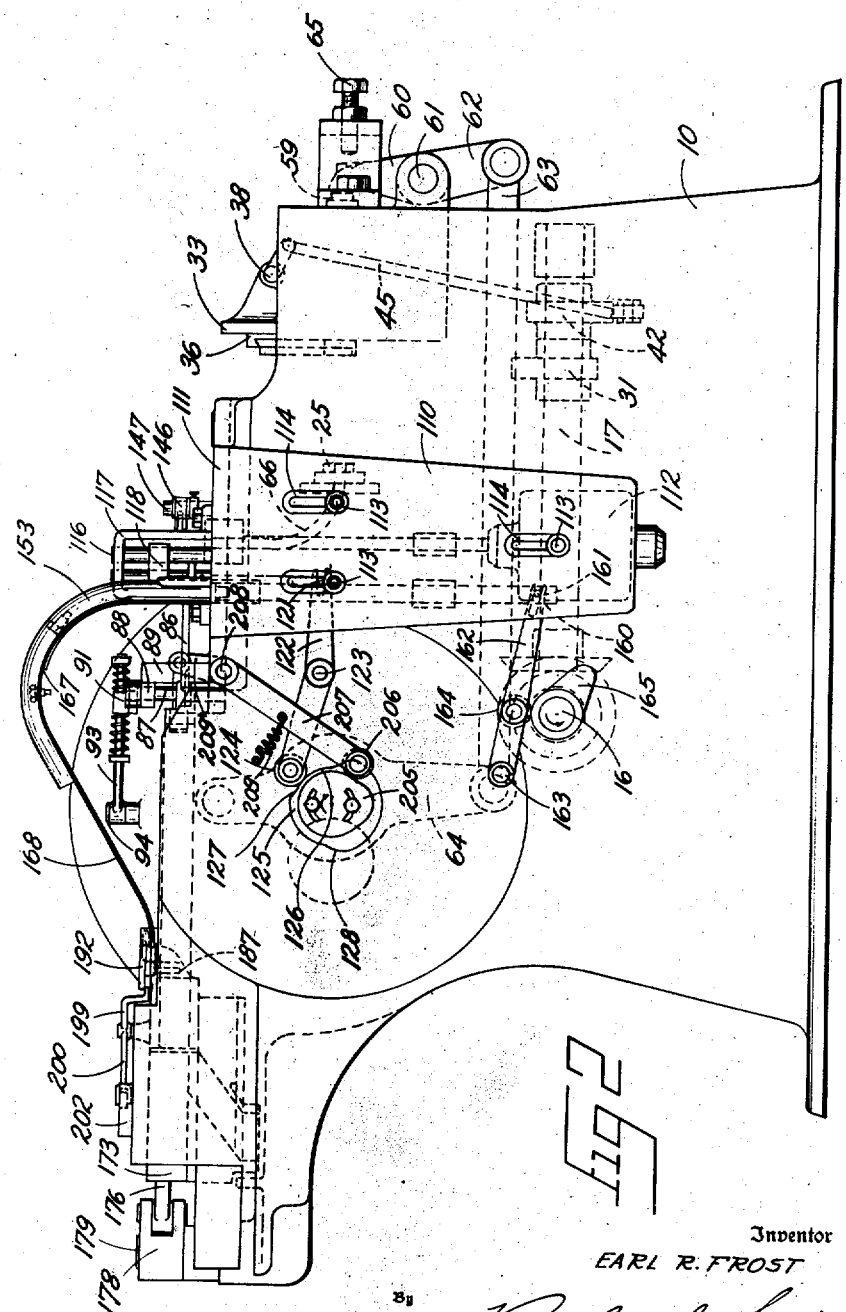

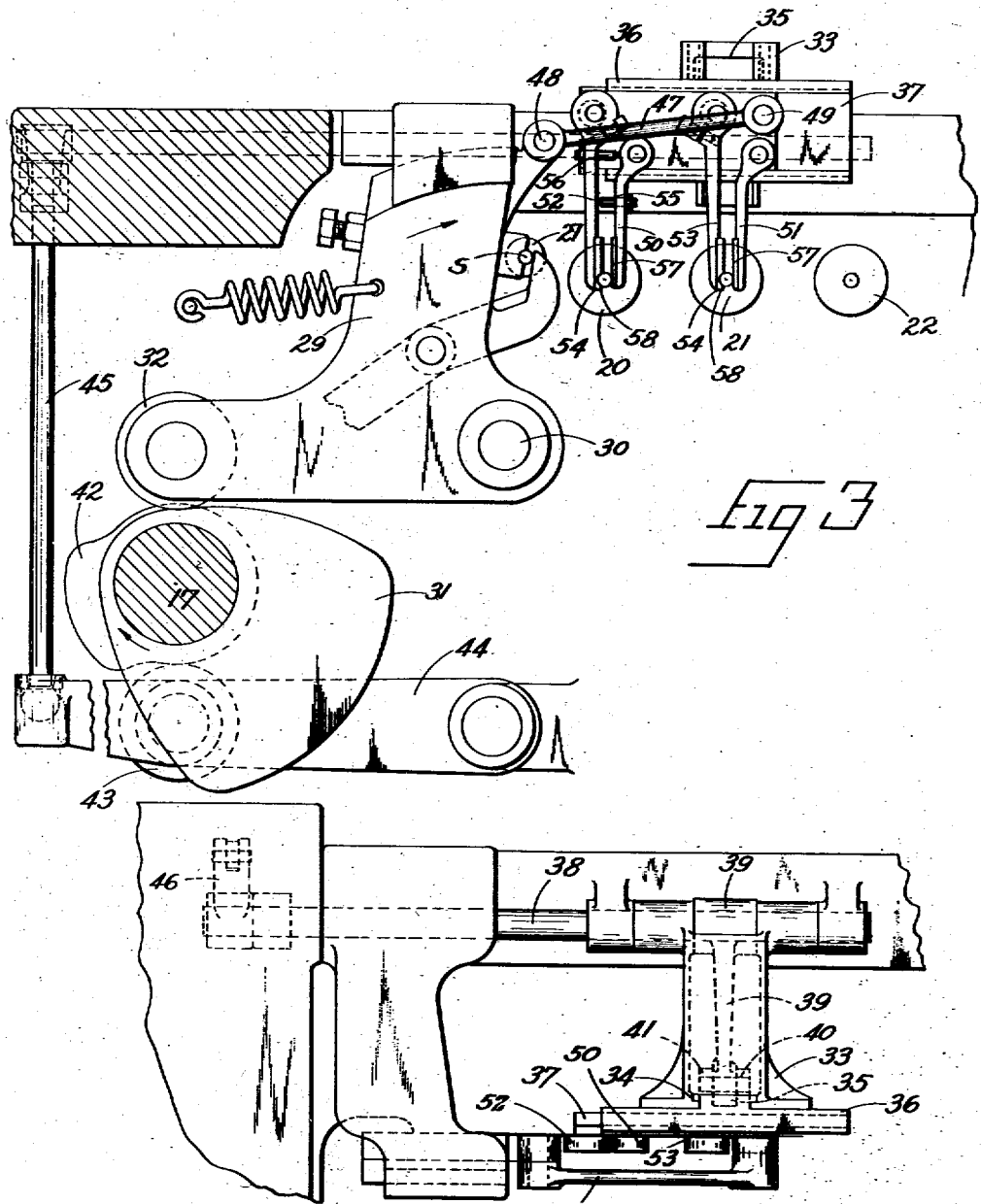

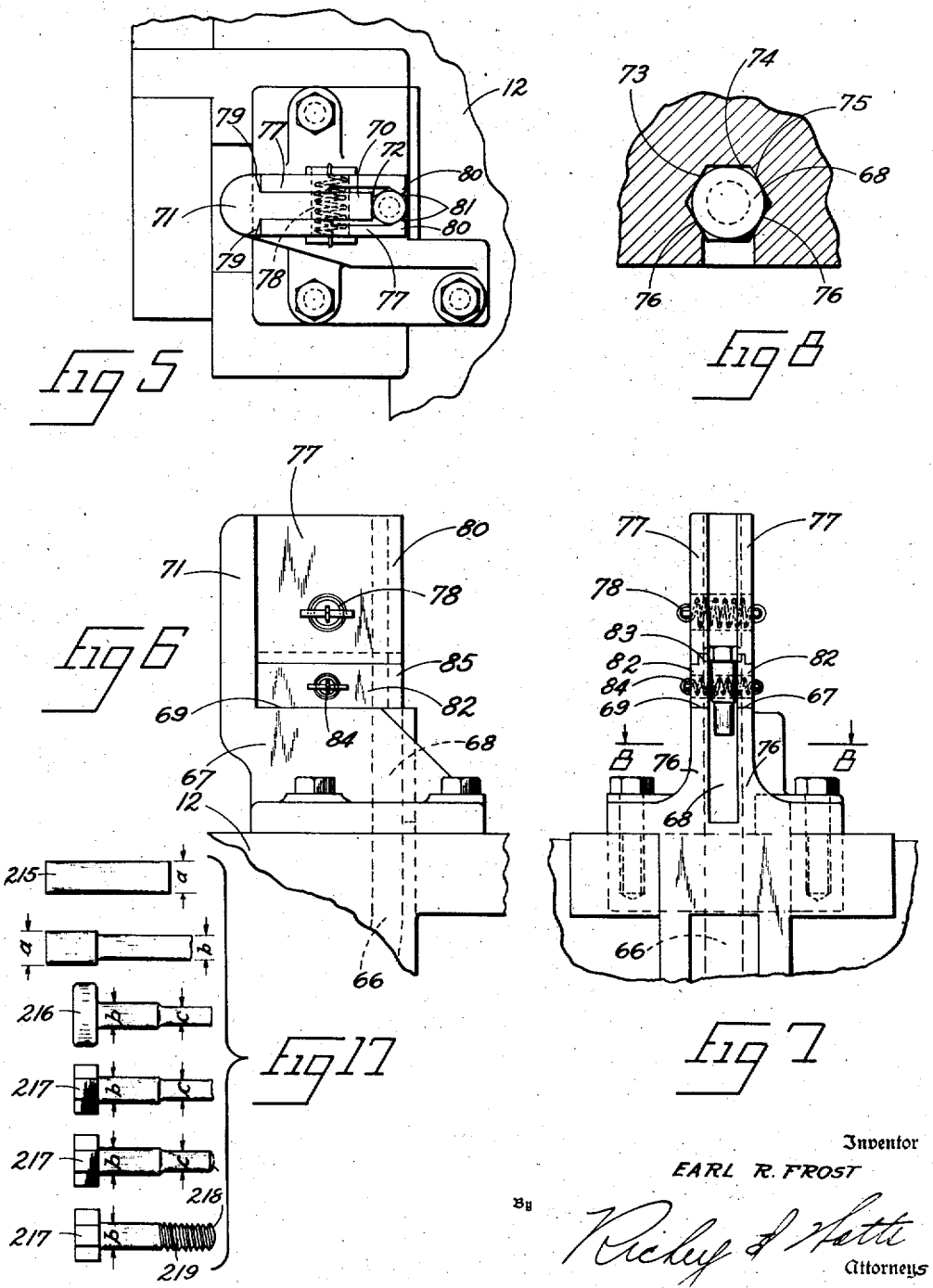

Nov. 12, 1935.    E. R. FROST    2,020,658
MACHINE AND METHOD FOR MANUFACTURING BOLTS
Filed Oct. 22, 1932    6 Sheets-Sheet 5
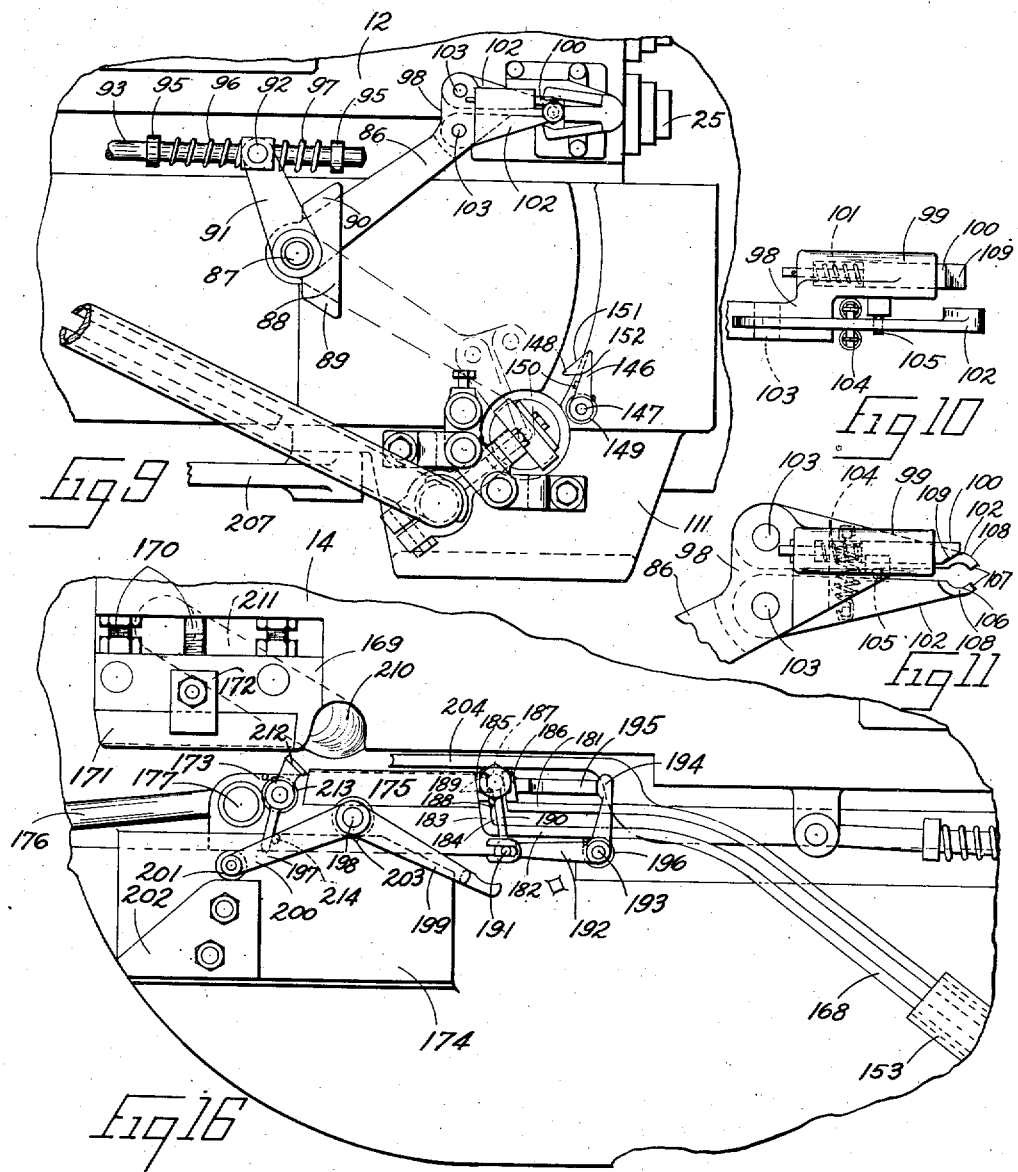
Inventor
EARL R. FROST
By
Richey & Watts
Attorneys

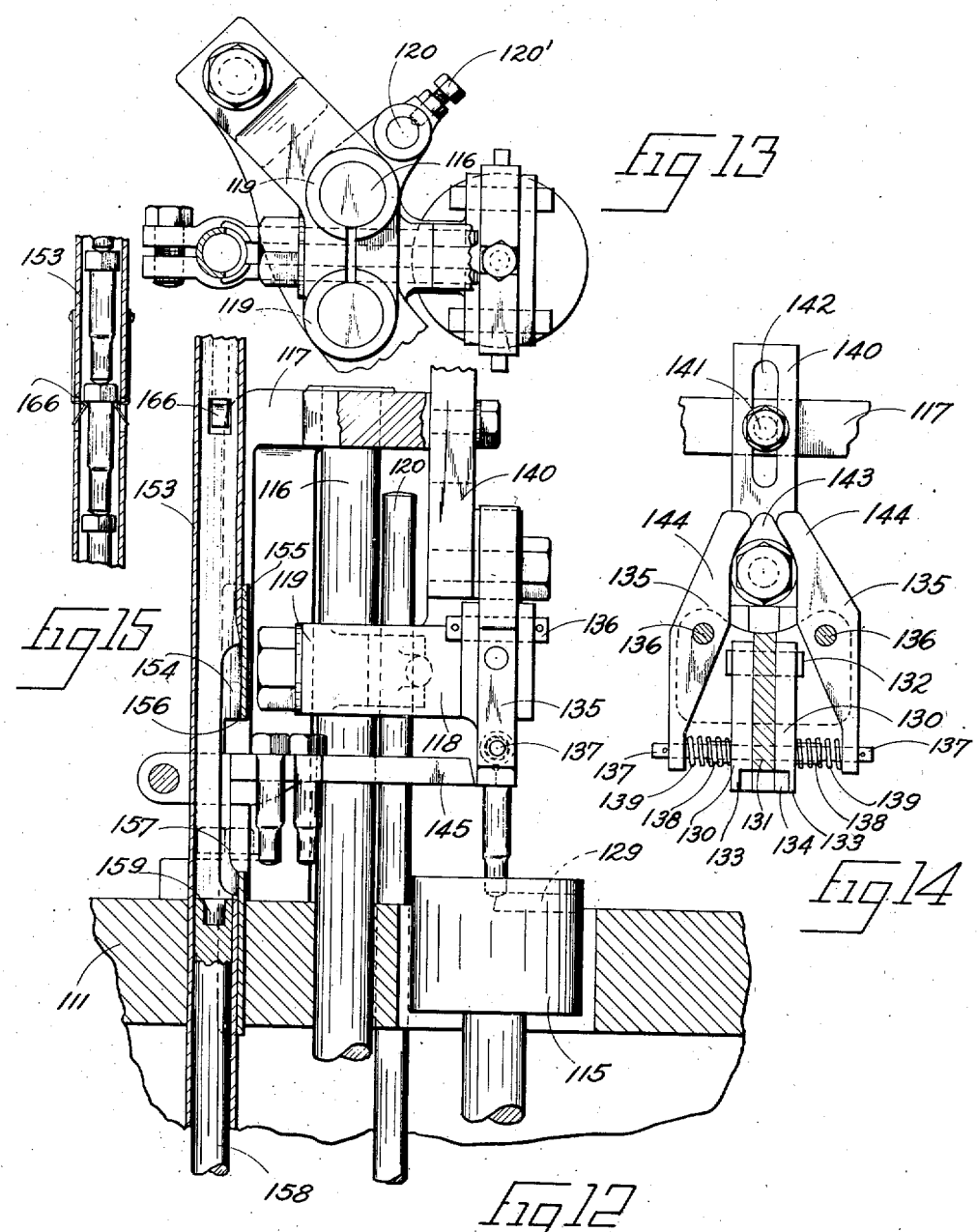

Patented Nov. 12, 1935

2,020,658

UNITED STATES PATENT OFFICE 2,020,658

MACHINE AND METHOD FOR MANU-
FACTURING BOLTS

Earl R. Frost, Tiffin, Ohio, assignor to The
National Machinery Company, Tiffin, Ohio, a
corporation of Ohio Application October 22, 1932, Serial No. 639,054

59 Claims. (Cl. 10—27)

This invention relates to metal working and particularly to a machine and process for manufacturing bolts.

Bolts have heretofore been manufactured in a number of different ways. The most desirable product, however, is obtained by upsetting the stock to form a head, and rolling the threads on the shank. Upsetting the head produces a desirable metal flow and similarly the formation of the threads by rolling instead of cutting produces flow lines in the metal conforming to the external contour so that the rolled threads are considerably stronger than cut threads.

The principal object of my invention is to provide a novel automatic machine for heading or performing other operations on blanks by means of a reciprocating slide, and in timed relation to the operation of the slide either pointing the ends of the blanks, rolling threads on the shanks, or both pointing and threading.

The use of rolled threads has been limited by the fact that the rolling operation presses the metal outwardly about the same amount it is pressed inwardly from the diameter of the unthreaded stock, so that the resulting threads have a greater overall diameter than the shank of the bolt. This prevents the use of this type of bolt for most purposes for which cut thread bolts are ordinarily used, unless the thread receiving portion of the blank is first reduced to the pitch diameter of the threads so that the resulting overall diameter will be equal to that of the shank.

A method has recently been developed in which stock of a greater diameter than the desired finished diameter of the bolt is cut into short lengths, extruded to the desired finished diameter through a portion of the length of each piece, again extruded through a portion of the first extruded part to the pitch diameter of the desired threads, the unextruded end being upset in a single blow to form a head. This method is disclosed in United States Patents No. 1,803,803, issued May 5, 1931 and No. 1,829,397, issued October 27, 1931.

When the stock is extruded to form the shank portions and thread receiving portions of the blank the metal is caused to flow longitudinally, a slightly greater flow occurring at the surface than at the center. As a consequence the end of the blank remote from the head becomes slightly concave if it is initially flat. This condition is also produced or accentuated by a roll threading operation in which the surface of the stock is again caused to flow longitudinally more than the central portions.

To avoid the production of a concave end on the bolt it is desirable to perform an operation known as pointing in which the end of the blank remote from the head is formed with a convex end or alternatively a conical chamfer. This operation is most conveniently performed before the threading in order to avoid mutilating the end of the threads during the cutting of the point. It is also desirable in most instances to point the blank sufficiently so that it will remain convex or chamfered after the completion of the threading operation in order to facilitate the entry of the bolt into the co-operating screw threaded member. I have discovered, however, that with the use of the extrusion process previously described it is impractical to point the blanks before extruding since the cut surface formed on the blank by the pointing tool hinders the passage of the blank into the extrusion die and tends to cause sticking. Accordingly, one of the objects of my invention is to provide a method and apparatus for continuously cutting off, heading, extruding and pointing bolt blanks preparatory to roll threading which will permit the continuous production of headed and pointed blanks in a single machine without losing control of the blanks and without interfering with the passage of the blanks into the extrusion dies.

The apparatus and method for pointing the blanks which is one of the features of my invention is also generally applicable to any type of pressure machinery for performing preliminary operations upon the blanks, such as a machine including a reciprocating slide operating solely to trim the blanks, or a machine for heading or operating upon the blanks in any way whether including the features and advantages of the extrusion process or not.

I have also discovered an apparatus and process for continuously roll threading the blanks and thereby producing completely headed, extruded, pointed and threaded bolts in a single machine, without losing control of the blanks. This feature of my invention is particularly adaptable for use in combination with and in timed relation to, a slide for performing heading, extruding or trimming operations upon the blank, the pointing mechanism for pointing each blank at the conclusions of the operations upon it by the slide, and means for presenting each blank to the roll threading mechanism at the conclusion of the pointing operation.

For certain types of work, however, the process and apparatus for threading the blanks which constitutes another of the features of my invention may be employed in combination with the slide for acting upon the blanks without the intermediate pointing operation. Similarly the roll threading feature, while particularly adaptable to a machine including a slide for heading, extruding and trimming the blanks may be used in combination with a slide for performing any preliminary operation upon the blank such as merely a trimming operation or a heading operation of any kind.

To carry out the general purpose of my invention I have also provided novel means for transferring the blanks from one stage to another to be operated upon by the header slide, another novel apparatus for removing blanks from a reciprocating slide and presenting the same to a pointing apparatus, and another novel arrangement for receiving blanks either directly from the preliminary operations of the heading slide or from the pointing mechanism and presenting the same in proper position and timing to the roll threading apparatus.

Specifically my invention also includes an improved transfer mechanism for moving the blanks to the various stages in which they are operated on by the header slide; means for receiving the blanks from the final operation by the header slide operable to hold the blanks in position to be picked up by another transfer arm irrespective of the length of the blank; adjustable means for picking blanks of any length from the position to which they are fed after being operated upon by the header slide, and transferring a blank during each cycle of the machine either to a station for gripping the blank and performing a pointing operation or some other operation upon it, or to a passage for delivery to mechanism for roll threading or otherwise operating upon the blank, which means is also operable when used to deliver blanks to a pointing station to discharge a pointed blank from the station; means for operating roll threading dies driven by a header slide having a shorter stroke than the desired stroke of the threading dies; and means for presenting blanks to a pair of moving roll threading dies in proper position and timed relation to be operated upon by said dies.

Many other objects of my invention relating to details of construction and economies of manufacture will appear hereinafter.

In the accompanying drawings which illustrate a preferred embodiment of my invention:

Figure 1 is a top plan view of a machine embodying the complete invention;

Figure 2 is a side elevation of the same;

Figure 3 is a front elevational view of the heading and extrusion dies, cut-off and transfer mechanisms;

Figure 4 is a top plan view of the transfer slide and operating parts;

Figure 5 is a top plan view of the receptacle which receives the blanks after the heading operations and holds the same to be seized by a transfer arm;

Figure 6 is a side elevational view of the same;

Figure 7 is an end view of the same;

Figure 8 is a section on the line 8—8 of Figure 7;

Figure 9 is a top plan view of the mechanism for transferring blanks from the slide to the pointing apparatus showing the transfer arm in full lines at one end of its stroke and in dotted lines at the other end;

Figure 10 is a side view of the blank holding head or the transfer arm;

Figure 11 is an enlarged top view of the same;

Figure 12 is a side elevational view, partly in section, of the pointing mechanism;

Figure 13 is a top plan view of the pointing mechanism;

Figure 14 is an enlarged detailed view of the clamp for holding the blanks during the pointing operation;

Figure 15 is a detail sectional view of the elevating passage;

Figure 16 is a top plan view of the roll threading mechanism and transfer arm for feeding blanks to the dies;

Figure 17 is a view of a series of blanks and a completed bolt illustrating the various steps of the process of my invention.

Referring to the drawings the machine illustrated comprises a bed frame 10 of heavy and rigid construction having its end formed in the usual manner as a die breast 11. A header slide 12 is mounted in suitable guide-ways to reciprocate longitudinally of the frame toward and away from the die breast 11. The header slide is preferably formed with an offset portion 13 terminating in a slide 14, the offset 13 passing over and around the crankshaft 15. A connecting rod is pivoted to the crank arm of the crankshaft and to the header slide 12 as indicated to reciprocate the header slide in the usual manner. This arrangement of the header slide with bearings on both sides of the crankshaft is particularly desirable to obtain accurate alignment of the header tools and dies. The entire length of the slide is effective to hold the slide in alignment in the guide-way. At the same time the crankshaft is as close as possible to the die breast, reducing the stretch of the bed frame under pressure. The crankshaft 15 is mounted in suitable bearings in the bed frame 10 and extends transversely across the machine. One end of the crankshaft is provided with suitable means for receiving power. A countershaft 16 is driven by the crankshaft at the same speed as the latter and in turn drives a camshaft 17 through bevel gears 18 and 19.

In the embodiment illustrated I have shown three different stations in the die breast 11 at which the blanks are operated upon by the header slide. These are the dies 20, 21 and 22 with which the punches 23, 24 and 25, respectively, carried by the header slide, co-operate. The die 20 is an extrusion die for reducing the diameter of the major portion of the blank, while the punch 23 merely operates to press the blank into the die 20. The die 21 is also an extrusion die for extruding the thread receiving portion of the shank, the co-operating punch 24 being a heading tool and operating to press the blank into the die 21 and also to upset the previously unextruded portion to form a head. The die 22 is merely a holding die co-operating with the hollow trimming punch 25 which trims the upset heads of the blanks to the desired polygonal form. It is to be understood, of course, that any desired combination and types of punches and dies may be used, the example illustrated being merely a preferred arrangement for carrying out the extruding and heading process previously referred to.

Rod or wire stock S is fed from a continuous roll or the like into the machine by any suitable type of feeding mechanism. Since the construction of these parts is well-known in the art I have not shown the specific elements and operating means. The stock S is fed through the bed frame at 27 and engages an adjustable stock gauge 28 (Figure 1). A cut-off arm 29 is arranged to engage the stock, shear off blanks of the desired length and carry the same into alignment with the first die 20. The arm 29 is pivoted to the frame as indicated at 30 and is operated by a cam 31 engaging a roller 32, the cam 31 being mounted upon the camshaft 17. During each cycle of the machine the arm 29 is rocked by the cam 31 to shear off a blank and carry the same into alignment with the die 20 during the time the header slide is retracted and then to return to its initial position to receive another blank while the header slide is moved forwardly into engagement with the work. The cut-off mechanism may be of the type disclosed in the patent of William L. Clouse, No. 1,856,028, April 26, 1932 to which reference is made for a more complete disclosure of the details of construction and operation of the cut-off arm.

The transfer mechanism for carrying blanks from the die 20 to the die 21 and from the die 21 to the die 22 consists generally of a frame 33 mounted on the top of the machine and carrying a vertically movable slide which in turn carries a horizontally movable slide. The frame 33 is formed with a vertically disposed dovetailed guide-way 34 within which is slidably mounted a bearing member 35 having rigidly connected thereto a horizontally disposed dovetailed guide-way 36. A slide 37 is mounted in the guide-way 36.

A rocker arm 38 is disposed transversely of the machine at the top behind the frame 33 and rigidly carries a lever arm 39 projecting through an opening in the frame 33 and having a pin 40 at its end slidably engaged by lugs 41 projecting from the vertically sliding member 35. A cam 42 on the camshaft 17 engages a roller 43 on a lever 44. A link 45 is connected to the end of the lever 44 and to an arm 46 carried on the end of the rocker shaft 38 so that the cam 42 produces an oscillation of the arm 39 during each rotation of the shaft 17. This oscillation of the arm 39 produces a straight vertical reciprocation of the slide 35 in the guide-way 33.

A connecting link 47 is pivoted to the upper end of the cut-off arm 29 as indicated at 48 and has its opposite end pivotally connected to the slide 37 as shown at 49. By reason of this arrangement rocking of the cut-off arm 29 produces a straight horizontal reciprocation of the slide 37 in its guide-ways 36. A pair of depending arms 50 and 51 are rigidly carried by the slide 37. The arm 50 is arranged so that its inner face is flush with the opening in the die 20 when the arm 29 is at one end of its stroke and and flush with the opening in the die 21 when the arm is at the other end of its stroke. The arm 51 is similarly arranged with respect to the openings in the dies 21 and 22. A pair of pivoted arms 52 and 53 are arranged to operate with the arms 50 and 51 respectively. Each arm 52 and 53 carries at its lower end a hardened wear plate 54 having a recess to receive and hold a bolt blank. Each arm 52 and 53 is secured by a set screw to an eccentric pin on a stud rotatably mounted in the slide 37, so that the set screw may be loosened and the stud rotated to adjust the arm vertically and align the holding recess with the die openings. An adjustable spring tension member 55 normally holds each arm 52 and 53 pressed toward its co-operating arm 50 and 51, respectively, and a stop member 56 on each of the arms 52 and 53 normally serves to limit the movement of the pivot arms toward the fixed arms. The wear plates 54 on the arms 52 and 53 and the co-operating straight surfaced wear plates 57 on the arms 50 and 51 are formed with beveled end surfaces as indicated at 58 to permit the arms to be forced open to snap over a blank. The blank holding recesses in the wear plates 54 permit the arms to be pressed apart and snap off a blank when withdrawn therefrom. If desired, or if necessary from the path of movement of the slide 37, the arms 50 and 51 may also be yieldably held in proper vertical position.

In operation during each cycle of movement of the header slide the cut-off arm, as previously explained, shears off a blank and carries it in alignment with the die 20 while the header slide is retracted. During this movement the slide 37 is caused to move laterally by the link 47 so that the arms 50 and 52 move from a position in vertical alignment with the die 20 to a position in vertical alignment with the die 21 and the arms 51 and 53 similarly move from the die 21 to the die 22. The roller 43 rides on the base circle of the cam 42 so that the slide 35 remains in its lowermost position and the pairs of arms move directly from the dies 20 and 21 into alignment with the dies 21 and 22 respectively. As the parts reach their limit of motion in this direction the header slide again approaches the dies and engages the various blanks to start their movement into the three dies 20, 21 and 22. At this time the cam 42 engages the roller 43, rocks the shaft 38 and causes the slide 35 to rise carrying with it the slide 37 and the pairs of fingers 50, 52 and 51, 53, the latter snapping off of the blanks previously held thereby and leaving the blanks in the dies 21 and 22. As the header slide continues its forward movement to press the blanks into the dies and perform the various operations upon the same the arm 29 moves to the left carrying with it the slide 37 which is retained in its raised position in the guideways 33 by the cam 42. As the header slide recedes from the die breast the cam 42 lowers the slide 35 so that the pairs of fingers 50, 52 and 51, 53 move down into registration with the dies 20 and 21 and snap over blanks held therein.

Suitable ejectors 59 are arranged to eject the blanks from the dies 20, 21 and 22 in the usual manner in such a way that as the punches 23, 24 and 25 recede the blanks are pressed out of the dies to follow the punches. In this way the shanks of the blanks project outwardly from the dies to permit the pairs of fingers carried on the transfer slide to snap over the same as the header slide recedes from the dies. The ejectors may be operated in any suitable way. As shown, they are pressed by levers 60 carried on a shaft 61 which is oscillated by an arm 62 driven by a link 63. The link 63 is pivoted at its opposite end to an oscillating frame 64 which receives a cam on the crankshaft 15. The heading pressure is received by adjustable backstop 65 engaging the levers 60 in alignment with the ejectors 59.

The hollow trimming punch 25 presses down over the head of the blank held in the die 22 and trims the head to a hexagonal or the desired polygonal shape. The passage 66 within the punch 25 receives the head of each blank and retains the blank during the next receding motion of the header slide. On the forward motion the projecting end of the shank of the blank last operated upon by the punch 25 engages the next blank held in alignment with the die 22 and first presses this latter blank down into the die 22. As the punch 25 continues its forward motion to engage the head of the blank held in the die 22 the blank previously acted upon is forced along through the passage 66. This passage 66 is hexagonal in shape so as to receive the heads of the blanks and permit the same to slide therethrough without turning axially. The passage 66 is curved as indicated in Figure 2 so that as the blanks are pressed through the trimming punch 25 they are caused to travel along the passage 66 and project upwardly head foremost through the top of the header slide 12.

A receptacle is provided on the top of the header slide 12 at the end of the passage 66 which is shown in detail in Figures 5, 6, 7 and 8. This receptacle consists generally of a bracket 67 bolted to the top of the header slide 12 and including a passage 68 semi-hexagonal in shape, in alignment with the end of the passage 66 and open on its rearward side. The upper portion of the bracket 67 is formed with a recess 69 on each side of substantially rectangular shape leaving a central tongue 70 projecting upwardly and an integral vertical rib 71 on the forward side. The tongue 70 is cut away to provide on its rearward face a vertical flat surface 72 arranged in continuation of the forward flat side of the passage 68. The passage 68 is formed in cross section as shown in Figure 8 with three flat surfaces 73, 74 and 75 fitting the three flat sides of one half of a hexagonal bolt head. It is also formed with two projecting lips 76 which extend part way over two other flat sides of the hexagonal bolt head so as to retain the bolt head within the passage and accurately guide the same. The lips 76 are spaced apart a sufficient distance to permit the passage therebetween of the shank of a bolt while holding the bolt head firmly in position.

A pair of plates 77 are set in the upper portion of the recesses 69 on opposite sides of the projecting tongue 70 and extend rearwardly past the surface 72 a sufficient distance to accommodate the bolt heads. The plates 77 are retained in position by a tension spring 78 of any suitable type extending through aligned apertures in the plates 77 and the tongue 70. The forward edges of the recesses 69 adjacent the rib 71 are tapered as indicated at 79 to permit a limited swinging movement of the plates 77 about the rib 71. The rearward edges of the plates 77 are formed with inwardly projecting lips 80 which are spaced rearwardly from the surface 72 a sufficient distance to extend over the opposite corners of a bolt head and with the surface 72, form a channel for receiving and guiding a bolt head. The two lips 80 are spaced apart from each other a sufficient distance to expose the shank of the bolt and are formed on their rearward sides with flared edges 81 arranged to permit the two plates 77 to be wedged apart by a member inserted between the same.

A pair of plates 82 similar to the plates 77 are also positioned in the recesses 69 on opposite sides of the tongue 70 below the plates 77. Each of the plates 82 is formed with a rabbeted upper edge 83 engaging a corresponding lower edge on the adjacent plate 77 so that the plates 82 when swung outwardly also carry outwardly the plates 77, although the plates 77 can swing outwardly without moving the plates 82. A spring 84 extends through aligned apertures in the plates 82 and the central tongue 70 in the same manner as the spring 78. The rearward edges of the plates 82 are formed with lips 85 identical with the lips 80 on the plates 77.

This receptacle provides a guiding and holding passage for the bolts in continuation of the passage 66 extending up to the upper edge of the tongue 70. The entire passage has its rearward side open between the lips 76, 80 and 85 a sufficient distance to permit passage of a bolt shank while being enclosed sufficient to retain a bolt head in position. The passage 66 is made of a fixed length and houses a number of trimmed bolts with the end of each abutting the head of the next bolt. When the machine is operating to form bolts of a certain length one of the bolts will ultimately project upwardly through the passage 68 so that its lower end is positioned between the lips 76 and its head is positioned between the plates 82 or the plates 77. An arm, which will be described more in detail hereinafter, with a pair of gripping jaws is caused to approach the rearward side of the bracket 67, spread the plates 77 or the plates 82 apart and grip the uppermost bolt about the shank immediately below the head. When the adjustment of the machine is changed to form bolts of a different length, one of the bolts, regardless of the number which may be housed within the passage 66, will ultimately be positioned with its head gripped between either the plates 82 or the plates 77 and with its lower end positioned between the lips 76. It will be evident that the position of the head of the uppermost bolt will vary depending upon the length of the bolts being formed by the machine. With certain bolts it may occur that the head of the uppermost bolt in position to be removed is engaged by the plates 77 and the head of the next succeeding bolt is engaged between the plates 82. When the plates 77 are then spread to permit the uppermost bolt to be gripped the plates 82 remain closed about the head of the next bolt so as to prevent its being released or being allowed to fall or move out of position. When the head of the uppermost bolt in position to be removed comes between the plates 82, or as shown in Figure 7, at or near the juncture between the plates, the spreading of the plates 82 also spreads the plates 77 so as to fully release the uppermost bolt.

The transfer means for removing the bolts from the passage in the bracket 67 and presenting the same to the pointing mechanism consists of an arm 86 secured to a vertical shaft 87 journalled in a bracket 88. The arm 86 is provided with a set screw or other suitable means for securing the same to the shaft 87 at any desired vertical position to align the end of the arm 86 with the uppermost bolt in the receptacle formed by the bracket 67, depending upon the length of the bolt being formed by the machine. The bracket 88 as shown in Figure 9 is formed with opposed side plates 89 and 90 serving as stops to limit the swinging movement of the arm 86. The arm 86 is swung by means of a link 91 secured to the top of the shaft 87 and pivotally carrying at its outer end a box 92. A rod 93 extends slidably through the box 92 and is pivoted to the slide 12 at 94 (Figure 1). The rod 93 carries a pair of spaced collars 95 disposed on opposite sides of the box 92 and a pair of springs 96 and 97 engaging the collars 95 and the box 92 and tending to hold the box 92 centered between the collars.

When the slide 12 moves rearwardly the spring 97 presses against the box 92 and swings the arm 91 to the left as seen in Figure 9. The arm 86 is likewise swung in the same direction until it engages the stop 90 which positions the arm 86 at one extreme of its movement as shown in full lines in Figure 9. Further rearward movement of the slide 12 compresses the spring 97 between its collar 96 and the box 92. On the forward movement of the slide 12 the arm 86 remains in the position shown in full lines in Figure 9 until the compression of the spring 97 is relieved and then the arms 91 and 86 are caused to swing to the right as seen in Figure 9 under the pressure of the spring 96. When the arm 86 engages the stop 89 in the position shown in dotted lines in Figure 9 it then remains in that position during the remainder of the forward stroke of the slide 12 while the spring 96 is compressed against the box 92.

The arm 86 carries at its free end a head 98 which is arranged to remove the bolts from the bracket 67. The head 98 carries a hollow arm 99 which slidably retains a bar 100 normally pressed outward by a spring 101. Below the arm 99 a pair of jaws 102 are pivoted to the head on the vertical rods 103. Springs 104 normally urge the jaws toward each other while a stop 105 limits their movement in this direction. The outer ends of the jaws 102 are formed with opposed recesses 106 arranged to pass over and grip the shank of a bolt. The ends of the jaws 102 are flared outwardly on the inner sides as shown at 107 to permit the jaws to be forced apart by a bolt shank and pass over the same. The jaws are also flared outwardly on their outer sides as indicated at 108 to permit the jaws to enter between the opposed lips 80 or 85 on the plates 77 or 82 and wedge the plates apart. The bar 100 is formed with a diagonal flat face 109 arranged substantially radially with respect to the center of the shaft 87 and designed to engage one of the flat surfaces of the head of the bolt when the jaws 102 grip the shank of the bolt below the head and spread the plates 77 or 82 as shown in full lines in Figure 9.

While the receptacle for receiving the blanks and transfer mechanism for removing the same from the receptacle is particularly useful in connection with the passageway 66 formed in the reciprocating slide 12, it will be understood that the same or equivalent means may be employed with a passage formed in the bed frame, when the final operation by the header slide does not require the passage of the blanks into the punch carried by the slide.

The pointing mechanism to which the blanks are transferred by the arm 86 is shown in Figures 2, 12, 13 and 14. This feature is claimed in the copending application of John H. Friedman, Serial No. 712,222, filed February 20, 1934. A bracket plate 110 is secured to the side of the bed frame and is formed with a horizontal top flange 111 in alignment with the top of the bed frame. A motor 112 is fastened to an inner bracket plate which is adjustably secured in position with respect to the bracket 110 by bolts 113 projecting through slots 114 in the bracket 110. The spindle of the motor 112 is arranged vertically and carries at its upper end a pointing tool 115. A pair of guide rods 116 are secured in the plate 111 at their lower ends and have their upper ends secured in a U-bracket 117. A chuck 118 is formed with bearings 119 slidably fitting about the guide rods 116 so that the chuck 118 is vertically slidable on the rods 116. A rod 120 is adjustably secured to the chuck 118 by a set screw 120' and is arranged to reciprocate the chuck. The lower end of the rod 120 carries a pin 121 fitting in a slot in one end of a bell crank lever 122. The lever 122 is pivoted to the bed frame as indicated at 123 and carries at its other end a roller 124 riding on a cam 125 which is one of two cams adjustably bolted to the end of the crankshaft 15 as shown in Figures 1 and 2. The roller 124 is retained in engagement with the cam 125 and the chuck 118 is normally held in its raised position by a spring connected at any suitable point. The cam 125 is formed with a relatively short base circle 126 and has its total lift from the base circle divided into a relatively abrupt shoulder 127 and a gradual lifting portion 128 extending through the major portion of the circumference of the cam. This arrangement produces a relatively rapid downward movement of the chuck 118 when the roller 124 engages the shoulder 127 to enter the blank carried by the chuck into the opening in the tool 115 and into engagement with the cutting knife 129, followed by a gradual downward movement of the chuck 118 as the knife 129 properly cuts the end of the blank. When the pointing operation is completed the roller 124 returns sharply to the base circle of the cam 125 lifting the chuck 118 to its uppermost position.

The blanks are held during the pointing operation by a pair of gripping jaws 130 pivoted to the opposite sides of a tongue 131 integral with the chuck 118 on a pin 132. The jaws 130 are formed with projections 133 extending downwardly below the end of the tongue 131 and each formed with an angled recess 134 to grip two opposite corners of a hexagonal bolt head. A pair of levers 135 are pivotally mounted on pins 136 carried by the chuck 118 and are apertured at their lower ends to fit over pins 137 projecting laterally outward from the jaws 130. The pins 137 are formed with enlarged portions 138 adjacent the jaws 130 against which the lower ends of the levers 135 may abut. Springs 139 surround the pins 137 to normally exert a pressure on the jaws 130 tending to hold the same together.

A bar 140 is adjustably bolted to the top of the U-frame 117 by means of a bolt 141 passing through a slot 142 in the bar 140 and carries at its lower end a cam 143. The upper ends of the levers 135 are formed with follower portions 144 engaging the cam 143 and shaped to permit spreading of the lower ends of the levers 135 when the chuck 118 is in its raised position and to force the lower ends of the levers 135 together and into engagement with the enlarged portions 138 of the pins 137 when the chuck 118 is lowered.

This arrangement provides a yielding pressure from the springs 139 holding the jaws 130 together when the chuck is in its raised position. As the chuck is lowered the ends 144 of the levers 135 are forced apart by the cam 143 so that the lower ends of the levers 135 move together increasing the spring pressure on the jaws 130 and ultimately engaging the enlarged portions 138 to rigidly clamp the jaws 130 together about a bolt head. This arrangement is co-ordinated with the cam 125 so that when the chuck 118 is in its raised position the jaws 130 may be easily spread to permit a bolt head to be inserted therebetween and resiliently gripped. As the roller 124 rides up on the shoulders 127 of the cam 125 and before the end of the bolt held by the jaws 130 reaches the cutting tool 129 the lower ends of the levers 135 are forced together to rigidly clamp the jaws 130 on the head of the blank held thereby. As the chuck 118 continues to descend while the roller 124 rides up on the portion 125 of the cam the levers 135 continue to hold the bolt rigidly clamped between the jaws 130. When the chuck 118 returns to its uppermost position the blank is again held only by the tension of the springs 139.

The tongue 131 is arranged substantially perpendicular to a radius of the arc defined by the transfer arm 86 so that the passage between the lower ends 133 of the jaws 130 is substantially tangential to this arc. Since the inclined surface 109 on the bar 100 carried by the head 90 is arranged substantially radially with respect to the shaft 87 it is evident that this inclined surface is presented to the jaws 130 substantially perpendicular to the passage between the lower ends 133 thereof. A blank held by the jaws 102 after being removed from the passage in the bracket 67 is held with its shank gripped by the recesses 106 in the jaws 102 and one flat side of its head in flat engagement with the surface 109 on the bar 100. The arm 86 is then swung on the next forward stroke of the header slide 12 from the position shown in full lines in Figure 9 to the position shown in dotted lines. As the arm 86 approaches the limits of its movement toward the stop 89 the head of the blank held by the jaws 102 is forced in between the jaws 130, the force for spreading the jaws 130 and pressing the bolt into position being applied by the surface 109 on the bar 100. After each pointing operation the chuck 118 returns to its uppermost position holding the pointed blank between the jaws 130. As the arm 86 swings toward the chuck to insert a new blank between the jaws 130 the previously pointed blank is forced directly rearwardly through the jaws 130 on to a track 145. The tension of the springs 139 in the raised position of the chuck 118 holds the jaws 130 together with sufficient force to hold the bolt blank and strip the same from the jaws 102 when the arm 86 moves away from the chuck 118.

In order to avoid any possibility of a blank being held by the jaws 102 when the arm 86 moves away from the chuck 118 and returns to its outermost position to receive another blank from the bracket 67 a stripper is mounted on the plate 111 in the path of movement of the bolt blank. This stripper consists of an arm 146 pivoted to the bracket at 147 and having a bifurcated hook shaped end 148. A spring 149 normally holds the arm 146 in position against the stop 150 while permitting the arm to be pressed backward away from the stop 150. The hooked bifurcated end 148 is formed with outer surfaces 151 inclined across the arc of movement of a bolt blank held by the jaws 102. When the arm 86 moves toward the chuck 118 carrying a blank the blank engages the inclined surfaces 151 and presses the arm 146 back out of the way. When the arm returns on its movement from the chuck 118 if a bolt blank should be retained in the jaws 102 it strikes the hooked recesses 152 and is stripped out of the jaws 102. The hooked end is bifurcated to provide two vertically spaced hooked portions, one of which passes over and the other of which passes under the jaws 102.

After the bolts have been acted on by the pointing mechanism and discharged into the track 145 they are then to be conveyed back to the roll threading mechanism. In order to facilitate the feed of the bolts to the roll threading die, it is desirable to elevate the same to the top of an inclined track and allow the blanks to fall by gravity down to the roll threading dies. Accordingly, a vertical tube 153 is secured in the bracket plate 111 and extends upwardly the distance it is desired to elevate the blanks. The tube has an internal diameter of sufficient size to receive and guide heads of the blanks and is provided with a cutout 154 on one side of sufficient size to permit bolt blanks to be passed laterally into the tube. This cut-out is of substantial height in order to permit the heads of the blanks to enter at any point corresponding to the plane at which they are discharged from the chuck 118 which is adjusted in accordance with the length of the blanks. A sleeve 155 surrounds the tube 153 and carries the track 145. The sleeve is provided with a cut-out 156 above the track 145 which is of substantially the same size and registers with the cut-out 154 so as to permit the passage into the tube 153 of the heads of the blanks on the track 145. The cut-out 156 is of sufficient width to permit the entrance into the tube 153 of the head of a blank from a point flush with the top surface of the track 145 to a point spaced thereabove the thickness of the maximum size head to be formed in the machine. Below the top of the track 145 the cut-out is narrowed as indicated at 157 so as to be of just sufficient width to permit the entrance into the tube 153 of a shank of a blank while preventing the passage of a head. It will be evident that the sleeve 155 may be adjusted to any desired level to accord with the position of the chuck 118 and that the cut-outs 154, 156 and 157 then permit entrance of the blanks into the tube 153 only at the end of the track 145.

A vertically reciprocating rod 158 is slidably disposed within the tube 153 and has its upper end formed with a cup-shaped recess 159 of a size and shape to receive and center the pointed end of a blank. The rod 158 extends downwardly within the bracket 110 and is formed at its end with a stud 160 for engagement with the forked end 161 of a lever 162. This lever is pivoted to the bed frame at 163 and carries a roller 164 engaging a cam 165 on the end of the countershaft 16. Spring means located at any suitable point retains the roller 164 in engagement with the cam.

Within the tube 153 at a point spaced above the cut-out 154 are a pair of spring pressed pawls 166 which are arranged to be forced outwardly to permit the head of a blank to pass upwardly therebetween and then to snap inwardly and engage the under surface of the head of a blank to prevent the same from again descending in the tube. The vertical stroke of the rod 158 is made sufficient so that the cupped end 159 in its lowermost position is spaced below the top of the track 145 a greater distance than the length of the blank for which the machine is adjusted. As the blanks are pressed on to the track 145 out of the jaws 130 they hang thereon with their heads in engagement and the entire series is pressed along the track until one blank drops off the end of the track 145 into the tube 153. The blank falls in the tube until its lower end rests upon and is centered by the upper end 159 of the rod 158. The rod 158 then raises forcing the blank upwardly through the tube 153 until its head passes the pawls 166. The rod 158 then descends in position to receive the next blank forced inwardly from the track 145.

The tube 153 extends vertically above the pawls 166 to the desired height and then curves rearwardly and downwardly. At the point where the series of blanks housed within the tube 153 reach a horizontal position the bottom of the tube 153 is cut out, as indicated at 167, a sufficient width to permit the passage of the shank but preventing the passage of a head of a blank. When the blanks forced upwardly through the tube reach this cut-out the shank drops downwardly so that the blanks are again hung by the under sides of their heads. Beyond this point the tube 153 merges into a track 168 which consists merely of spaced rails engaging the under surface of the heads of the blanks. The track 168 extends downwardly at a substantial angle to provide a gravity feed of the blanks to the roll threading dies. When it is desired to utilize the roll threading feature of my invention without pointing the blanks the chuck 118 may be fixed and the jaws 130 used merely as strippers to remove the blanks from the jaws 102, or a simpler form of stripper may be used without embodying the chuck in the machine.

The roll threading dies are mounted at the rear end of the machine. The slide 14 which constitutes an extension of the slide 12 connected thereto by the offset portion 13 is cut away at its top on one side to provide room for the dies. A holding block 169 for one die is set directly into the side of the slide 14 and is adjustably mounted in the usual manner by means of screw elements 170. A die 171 is clamped in the holder 169 by clamps 172. The die 171 therefore reciprocates with the slide 14.

A co-operating die holder 173 is slidably mounted on the bed frame adjacent and facing the holder 169. The holder 173 bears laterally against the bed frame on suitable bearing liners and downwardly against a bearing liner or filler block which also serves as a lateral bearing for the slide 14, and is retained in position by a top clamping plate 174. A die 175 is clamped in the usual manner in the holder 173. The holder 173 is reciprocated by a connecting rod 176 pivoted to the end of the holder at 177 and pivoted at its opposite end to a walking beam 178. The beam 178 is journalled at 179 to the bed frame and has its opposite end connected by a link 180 to the slide 14. Preferably the pivot 179 for the walking beam 178 is offset slightly from the center so that the stroke of the holder 173 is less than the stroke of the slide 14.

The threading dies 171 and 175 are of the usual type employed with threading machines in which one die holder is stationary and the other reciprocates. The details of the dies themselves are well known in the art and are therefore not shown.

The track 168 extends downwardly into the plane of the top of the die 175 and terminates immediately adjacent the position of the end of the holder 173 when the holder is at the end of its forward stroke. The track 168 at this point consists of two rails 181 and 182 spaced apart to accommodate the shanks of the bolts while allowing the heads to ride on the top surfaces of the rails. The rails 181 and 182 are of substantial depth to guide the shanks of the bolts. The rail 182 is formed with an integral end 183 extending outwardly at an angle thereto and forming an abutment for the end of the track 168. The rail 181 terminates short of the extended end 183 to leave a passage 184 therebetween of the same size as the passage in the track 168. A pair of track members 185 and 186 are mounted on the holder 173. These members may conveniently be connected together at the bottom by a U-member 187 so that the tops of the members 185 and 186 may serve as supports for the under surface of a bolt head and the sides may engage the shank throughout its length to hold it in proper vertical position. The space between the members 185 and 186 is positioned so as to be directly in alignment with the passage 184 when the holder 173 is at the end of its forward stroke. If desired a spring pawl 188 may be mounted on the extended end 183 to yieldably hold the blanks from passing through the passage 184 until forced therethrough, and similarly a spring pawl 189 may be mounted on the member 185 to yieldably hold a blank in position between the members 185 and 186.

A pusher 190 is arranged to push bolts from the track 168 through the passage 184 and into position between the members 185 and 186 when the holder 173 reaches the end of its forward stroke and these parts are in alignment. This pusher preferably includes upper and lower arms, one of which passes over the rail 182 to engage the bolt head and the other of which passes under the rail 182 to engage the bolt shank. These arms are connected by a pin 191 which rides in the forked end 192 of a bell crank lever pivoted to the bed frame at 193. The opposite end 194 of the bell crank lever is arranged to abut a projection 195 extending forwardly from the end of the holder 173. By this arrangement as the holder 173 approaches the limit of its forward movement the extension 195 engages the end 194 of the bell crank lever and actuates the pusher 190 to force the lowermost blank in the track 168 into position between the members 185 and 186. A spring 196 retracts the pusher 190 so as to clear the member 186 when the holder 173 starts on its rearward movement.

A bell crank lever 197 is arranged to force the blanks out of position between the members 185 and 186 and into position between the roll threading dies when the holder 173 reaches the end of its rearward movement. This lever 197 is pivoted to the holder 173 at 198 and has a hooked end 199 riding over the top of the members 185 and 186 to engage the head of a bolt positioned therein. The opposite end 200 of the bell crank lever 197 is provided with a roller 201 riding on a cam 202 bolted to the plate 174. As the holder 173 moves rearwardly a spring 203 holding the roller 201 against the cam 202 causes the bell crank lever 197 to rock bringing the hooked end 199 from the position shown in Figure 16 into engagement with the head of a blank positioned between the members 185 and 186. As the holder 173 reaches the end of its rearward movement the contour of the cam 202 allows the end 199 of the bell crank lever to force the blank out from between the members 185 and 186 and into position between the two roll threading dies 175 and 171. The space between the dies is just sufficient to accommodate the shank of the bolt so that the under surface of the head rides on the top surfaces of the dies. When the holder 173 returns to its forward position the cam 202 forces the hook 199 out of the path of movement of the blanks from the track 168.

In order to insure engagement of the blank with the thread rolling portions of the dies 171 and 175 at exactly the right time a starting pusher 204 is arranged between the dies and is formed with an end to abut against the blank through a substantial portion of its length to position the blank firmly between the dies in the proper vertical position and at the correct time. This starting pusher 204 is actuated by a cam 205 bolted to the end of the crankshaft 15 as shown in Figure 2.

A roller 206 engages the cam 205 and is mounted on the end of a lever 207, the opposite end of which is fixed to a shaft 208. A spring 209 holds the roller 206 in engagement with the cam. Swinging of the lever 207 under the influence of the cam 205 causes rocking of the shaft 208. An arm 209' secured to the shaft 208 is pivoted to the extended end of the starting pusher 204 so that rocking of the shaft 208 reciprocates the pusher 204 and presses the blank into position to be engaged by the threading portions of the dies 171 and 175 at the proper time.

Suitable means are provided to eject the completely threaded blank from between the dies at the conclusion of the threading operation into an opening 210 formed in the slide 14 and communicating with a passage 211 through which the completed bolts are discharged. In the embodiment shown a finger 212 is pivoted to the holder 173 and is normally held swung out of position between the dies by a spring 213. A stop pin 214 mounted on the plate 174 is arranged to engage the end of the finger 212 as the holder 173 reaches the end of its forward movement so that the finger is rocked against the tension of the spring 213 to kick the completed bolt out of position between the dies and into the opening 210.

The operation of my improved machine produces a completely headed, pointed and threaded bolt from continuous stock at each revolution of the crankshaft. The various stages in the operation are best illustrated by the views of the series of blanks in process of completion shown in Figure 17. The stock S is initially of greater diameter than the desired finished diameter of the bolt shank and is cut off into the selected lengths to form blanks 215 having a diameter $a$. Each blank is first acted on by the co-operating die 20 and punch 23 to extrude the major portion of its length to a smaller diameter $b$ leaving a part of the blank at the original diameter $a$. The blank is then acted on by die 21 and punch 24 to extrude a part of the end of the shank to a smaller diameter $c$ leaving another part at the extruded diameter $b$ and simultaneously to upset the previously unextruded portion to form a round head 216. The blank is then held in the die 22 and forced through the hollow trimming punch 25 to trim the head to the form of a finished hexagonal or other suitable polygonal head 217. The trimmed blanks are then carried by the chuck 118 into engagement with the pointing tool and the ends are formed with a point 218. In the final operation the portions of the shanks which have been extruded to the diameter $c$ are rolled with threads 219, the overall diameter of which is exactly equal to the portion of the shank having the diameter $b$.

After the machine has begun to operate and the various transfers and passageways are filled with blanks, each of these operations is performed upon one blank during each revolution of the crankshaft. The blanks are carried laterally from the die 20 to the die 21 and from the die 21 to the die 22 in the usual manner employed in cut and carry presses so that when the header slide moves forwardly a blank is acted upon at each of these die stations. The transfer arm 86 swings out over the header slide 12 and picks a blank from the bracket 67 at the end of each rearward stroke of the header slide. During the forward stroke of the header slide this arm carries the blank to the pointing mechanism and places it between the jaws 130 on the chuck 118.

The chuck 118 descends and points the blank held thereby during each rearward stroke of the header slide while the arm 86 is receiving another blank from the bracket 67. As each blank is pressed into the jaws 130 by the arm 86 the previously pointed blank is forced on to the track 145 and the blank at the other end of the track 145 drops into the tube 153. During the succeeding rearward stroke of the header slide the rod 158 elevates the blank dropped into the tube 153 to the pawls 166 and advances all of the blanks in the portion of the tube 153 above the pawls 166 so that the topmost blank slides down the track 168. At the end of each rearward stroke of the header slide the lowermost blank in the track 168 is transferred laterally into position between the members 185 and 186 carried on the end of the die holder 173 which is then at the end of its forward stroke. At the end of the forward stroke of the header slide and the rearward stroke of the die holder 173 the blank carried by the members 185 and 186 is forced in between the two threading dies 171 and 175 and is pressed rearwardly into engagement with the threading portions of the dies by the starting pusher 204. During each rearward stroke of the header slide and forward stroke of the holder 173 the threads are rolled upon the portion of the blank which has been extruded to the pitch diameter of the threads or the diameter $c$ as shown in Figure 17. Also at the end of the rearward stroke of the header slide the completed bolt is ejected from between the threading dies.

Although I have disclosed a complete specific embodiment of my invention it is to be understood that the various features thereof may be used in combination with different specific types of constructions. For example, the pointing mechanism and the roll threading mechanism may be employed together with any suitable type of heading slide or either of these mechanisms may be employed with the header slide without the other. Similarly with the pointing mechanism and/or the threading mechanism the header slide may be constructed to carry out the combined heading and extruding process as disclosed or may be constructed simply to carry out any conventional heading process or merely a trimming or other similar operation upon the blank. Likewise other forms of trimming dies may be used or heading dies which require no trimming may be employed in which event the blanks may be ejected into a passageway formed in the bed frame instead of the passageway formed in the header slide as illustrated. In this event, however, the transfer arm or equivalent mechanism may nevertheless be employed to remove the blanks one at a time from the receptacle which receives the blanks at the end of the passageway and transfer the same to the pointing chuck as illustrated or in any equivalent manner. Similarly when it is not desired to utilize the pointing mechanism the blanks may be delivered directly from the operations performed by the heading slide to the roll threading mechanism which may be located as shown or in any other convenient location to be driven by the header slide. Many other modifications and variations of structural details and arrangements of parts may be resorted to without departing from the scope of the various features of my invention as defined in the following claims.

1. In a machine of the class described, in combination, a bed frame, a reciprocating slide mounted within said bed frame, cooperating tools carried by said slide and bed frame arranged to act upon a blank to form a head thereon, one of said tools being hollow and being arranged to receive a headed blank therein after it has been acted upon, a passageway communicating with said hollow tool and arranged to receive a series of blanks and guide the same by said heads, a pointing tool carried by said bed frame and means for engaging and positively removing blanks individually from said passageway, gripping the heads of the blanks and presenting the shanks thereof to said pointing tool.

2. In a machine of the class described, in combination, a bed frame, a reciprocating slide mounted within said bed frame, cooperating tools carried by said slide and bed frame arranged to act upon a blank, one of said tools being hollow and being arranged to receive a headed blank therein after it has been acted upon, a passageway communicating with said hollow tool and arranged to receive and guide a series of blanks, a pointing tool carried by said bed frame and means for gripping and removing blanks individually from said passageway and presenting the same to said pointing tool, said means being operated by said slide and being arranged to remove one blank from said passageway during each complete cycle of the movement of said slide.

3. In a machine of the class described, in combination, a bed frame, a reciprocating slide mounted in said bed frame, trimming tools carried by said slide and bed frame including a hollow trimming die and a cooperating member arranged to press headed blanks through said hollow trimming die and trim the heads thereof to polygonal form, a passageway communicating with said hollow trimming die and arranged to receive the blanks pressed therethrough and guide the same by said polygonal heads, pointing mechanism mounted on said bed frame, and means for individually removing blanks from said passageway and presening the same to said pointing mechanism.

4. In a machine of the class described, in combination, a bed frame, a reciprocating slide mounted in said bed frame, trimming tools carried by said slide and bed frame including a hollow trimming die and cooperating member arranged to press headed blanks through said hollow trimming die, a passageway communicating with said hollow trimming die and arranged to receive the blanks pressed therethrough, pointing mechanism mounted on said bed frame, and means for individually removing blanks from said passageway and presenting the same to said pointing mechanism, said means being actuated by said slide and arranged to remove a blank from said passageway in timed relation to the pressing of blanks through said hollow trimming die.

5. In a machine of the class described, in combination, a reciprocating slide carrying a tool for acting upon a blank, means for holding a blank in position to be acted upon by said tool, said slide and tool having a passageway for receiving a blank after it has been acted upon by said tool, a second tool mounted in a fixed position with respect to said slide, and means arranged to grasp the blanks and remove the same from said passageway in succession and present each blank in turn to said second tool.

6. In a bolt making machine, a die for holding headed blanks, a reciprocating slide having a hollow trimming die arranged to coact with said holding die to trim the head of a blank held therein and retain the blank within said trimming die, said slide having a passageway therein to receive trimmed blanks from said hollow trimming die, means to remove a blank from said passageway, and means for successively presenting the blanks removed from said passageway to a pointing tool.

7. In a bolt making machine, in combination, a bed frame, a heading slide reciprocably mounted within said bed frame, means for reciprocating said heading slide, a plurality of co-operating dies and punches carried by said heading slide and bed frame, means for feeding elongated stock and means for cutting off lengths of said stock and presenting the same to the first of said co-operating dies and punches, said dies and punches including an extrusion die for reducing the diameter of the lengths of stock and means for upsetting the lengths of stock to form headed blanks, a passageway in said machine for receiving and guiding the headed and extruded blanks after the same have been operated upon by said heading slide, said passageway having one end aligned with the direction of movement of said heading slide, means for aligning the headed and extruded blanks with said end of said passageway in such a manner that each movement of said heading slide towards said dies forces a blank into said passageway, a pointing mechanism carried by said bed frame, and means operating in timed relation to said heading slide to remove a blank from said passageway during each cycle of the movement of said heading slide and present the same to said pointing mechanism.

8. In a bolt making machine, a bed frame, a heading slide reciprocably mounted within said bed frame and carrying a series of punches, a series of dies mounted upon said bed frame for co-operation with said punches, means for feeding elongated stock, means for cutting off lengths of stock and presenting the same to the first of said co-operating dies and punches, means for transferring the lengths of stock from one to another of said co-operating dies and punches, one of said dies being an extrusion die for reducing the diameter of the lengths of stock, said punches operating to upset said lengths to form headed blanks, and one of said punches being hollow to receive therein the completed headed and extruded blank, a passageway in said heading slide communicating with said hollow punch, a pointing mechanism mounted on said bed frame, and means for removing blanks from said passageway and presenting the same to said pointing mechanism.

9. In a combined blank forming and threading machine, a bed frame having a slideway formed therein, a crankshaft journalled in said bed frame and extending across said slideway, a header slide driven by said crankshaft and having spaced bearing portions bearing in said slideway on opposite sides of the crankshaft, a punch carried by one end of said header slide and arranged to co-operate with a die mounted on said bed frame, a reciprocating roll threading die carried by said header slide on the opposite side of the crankshaft from said punch, a co-operating roll threading die mounted upon said bed frame, means for feeding blanks to said punch and die and means for transferring the blanks acted upon by said punch to said roll threading dies without losing control thereof.

10. In a machine of the class described, a bed frame having a slideway therein, a crankshaft journalled in said bed frame and extending across said slideway, a header slide driven by said crankshaft and bearing in said slideway, said slide having an extension spanning said crankshaft and extending to the opposite side thereof, co-operating heading tools carried by an end of said heading slide and by said bed frame, a roll threading die mounted on said bed frame and a co-operating roll threading die mounted on said extension of the header slide on the opposite side of said crankshaft from said heading tools, and means for conveying blanks acted on by said heading tools to said co-operating roll threading dies.

11. In a machine of the class described, a bed frame having a slideway therein, a crankshaft journalled in said bed frame and extending across said slideway, a header slide driven by said crankshaft and bearing in said slideway, said slide having an extension spanning said crankshaft and extending to the opposite side thereof, co-operating heading tools carried by an end of said heading slide and by said bed frame, a roll threading die mounted on said bed frame and a co-operating roll threading die mounted on said extension of the header slide on the opposite side of said crankshaft from said heading tools, and means for conveying blanks acted on by said heading tools to said co-operating roll threading dies, said means operating in timed relation to said heading slide to present a blank to said threading dies during each cycle of the operation of said header slide producing a completely headed blank.

12. In a combined blank forming and threading machine, a bed frame, a reciprocating heading slide mounted in said bed frame, a punch mounted on an end of said slide and a co-operating die carried by said bed frame, a reciprocating roll threading die mounted upon a side of said header slide, a co-operating roll threading die mounted on said bed frame, and means for transferring the blanks acted upon by said punch and die to said roll threading dies in the same consecutive order in which they are acted upon by said punch and die.

13. In a bolt making machine, a bed frame, a reciprocating heading slide mounted in said bed frame, a punch mounted on an end of said slide and a co-operating die carried by said bed frame, a reciprocating roll threading die mounted upon a side of said header slide, a co-operating roll threading die slidably mounted upon said bed frame and driven by said header slide in the opposite direction, and means for transferring the blanks acted upon by said punch and die to said roll threading dies.

14. In a bolt making machine, a bed frame, a reciprocating header slide mounted in said bed frame, a punch mounted on said slide and a co-operating die carried by said bed frame, a roll threading die mounted upon said slide, a co-operating roll threading die mounted on said bed frame, means for presenting blanks to said punch and die and means for presenting the blanks acted on thereby to said roll threading dies in the same consecutive order in which the blanks are acted upon by said punch.

15. In a bolt making machine a bed frame, a reciprocating header slide mounted in said bed frame, a punch carried by said slide and a co-operating die mounted in said bed frame, a roll threading die carried by said slide, a co-operating roll threading die mounted on said bed frame, means for presenting blanks to said punch and die and means for presenting a blank acted on by said punch and die to said roll threading die during each cycle of the movement of said slide.

16. In a bolt making machine, a bed frame, a reciprocating header slide in said bed frame, co-operating heading tools mounted on said slide and bed frame and operable to head a blank, a pair of reciprocating roll threading dies driven by said slide, means for presenting a blank to said heading tools during each cycle of the movement of said slide in position to be acted upon during a forward movement of the slide, and means for presenting a headed blank to said roll threading dies during each cycle of the movement of said slide in position to be acted on thereby during a rearward movement of the slide.

17. In a bolt making machine, a bed frame, a reciprocating header slide in said bed frame, co-operating heading tools mounted on said slide and bed frame and operable to head a blank, a roll threading die mounted on said slide, a co-operating roll threading die mounted on said bed frame, means for presenting blanks to said header tools to be headed during the forward movement of said slide, and means for presenting the blanks headed by said tools to said roll threading dies to be acted on thereby during the rearward movement of said slide.

18. In a bolt making machine, a bed frame, a header slide in said bed frame, co-operating heading tools on said slide and bed frame, a roll threading die carried by said slide, a co-operating roll threading die slidably mounted in said bed frame and reciprocating in the opposite direction to said first die, means for presenting blanks to said tools to be headed, and means for presenting the blanks headed by said tools to said roll threading dies.

19. In a bolt making machine, a bed frame, a reciprocating slide therein, a pair of roll threading dies, means for actuating said slide and threading dies, co-operating tools on said slide and bed frame, means for presenting blanks in consecutive order to said tools to be acted on thereby, a pointing mechanism fixed with respect to said slide, means for presenting the blanks acted on by said tools to said pointing mechanism in the same consecutive order and means for presenting the pointed blanks to said roll threading dies in the same consecutive order, both of said last named means operating in timed relation to the movement of said slide.

20. In a machine of the class described, in combination, a bed frame having a rotating crankshaft journalled therein, a blank pointing mechanism mounted on said bed frame, a reciprocating chuck actuated in timed relation to said crankshaft for presenting a blank to said pointing mechanism during each revolution of said crankshaft, a pair of relatively reciprocating roll threading dies driven by said crankshaft, and means operating in timed relation to said crankshaft for presenting the blanks pointed by said pointing mechanism to said roll threading dies.

21. In a machine of the class described, a transfer mechanism for headed blanks comprising a conduit arranged to receive and guide the heads of a series of blanks disposed longitudinally therein, a receptacle communicating with said conduit and having an open side to permit the passage therethrough of the shank of a blank while retaining the head, means at least partially encircling the heads of blanks positioned in said receptacle and retaining the same, said means being yieldable to permit spreading thereof to form an opening wide enough to pass the head of a blank in alignment with said open side.

22. Means for transferring headed blanks comprising a conduit to receive and guide a series of blanks, a receptacle communicating with said conduit including two longitudinally arranged pairs of plates at least partially encircling the heads of blanks positioned in said receptacle to guide the same, each of said pairs of plates being mounted for spreading movement to permit the lateral passage of a blank therethrough, at least one of said pairs being movable independently of the other.

23. Means for transferring headed blanks comprising a conduit to receive and guide a series of blanks, a receptacle communicating with said conduit including two longitudinally arranged pairs of plates at least partially encircling the heads of blanks positioned in said receptacle to guide the same, each of said pairs of plates being mounted for spreading movement to permit the lateral passage of a blank therethrough, and means connecting said plates arranged to force one pair open when the other is spread and permitting independent opening of said other pair.

24. In a machine of the class described, a bed frame carrying a plurality of aligned dies, a reciprocating header slide having a punch co-operating with each die, means for feeding elongated stock, an oscillating cut-off arm pivoted to said bed frame, and arranged to cut off lengths of stock and carry the same to the first die, a vertical guideway mounted on said bed frame having a carriage slidable therein and carrying a horizontal guideway, a transfer slide movable in said horizontal guideway having means for carrying blanks from one die to another, means connecting said cut-off arm to said transfer slide, a cam for oscillating said cut-off arm, and a second cam for reciprocating said carriage in its guideway.

25. Means for transferring blanks having polygonal heads comprising a transfer arm having a pair of spring fingers to grip a blank below the head, and a member positioned above said fingers having a flat face to engage one of the flats of a polygonal blank head.

26. Means for transferring blanks having polygonal heads comprising a transfer arm having a pair of spring fingers to grip a blank below the head, and a member positioned above said fingers having a flat face to engage one of the flats of a polygonal blank head, and means for receiving blanks from said transfer arm including members formed to receive the head of a blank and hold the same during withdrawal of said transfer arm.

27. In a machine for making bolts, in combination, a bed frame, a reciprocating slide mounted within said bed frame, co-operating tools carried by said slide and bed frame arranged to act upon a blank, a passageway in said machine arranged to receive in succession the blanks acted upon by said tools, said reciprocating slide being arranged to press blanks acted upon by said tools into said passageway in the direction of the reciprocation of said slide, said passageway being arranged to guide said blanks and positively retain the same in the successive order in which they are acted upon by said tools, a pointing mechanism carried by said bed frame and means for grasping an individual blank from said passageway in order and presenting the same to said pointing mechanism in timed relation to the operation of said reciprocating slide.

28. In a machine for making bolts, in combination, a bed frame, a reciprocating slide mounted within said bed frame, co-operating tools carried by said slide and bed frame arranged to act upon a blank to form a polygonal head thereon, a passageway arranged to receive blanks acted upon by said tools and constructed to fit the polygonal heads of the blanks and thereby guide the same, said reciprocating slide being arranged to press blanks acted upon by said tools into said passageway in succession, a pointing mechanism carried by said bed frame and means for successively gripping the heads of the blanks delivered by said passageway and presenting the ends thereof to said pointing mechanism.

29. In a bolt making machine, a bed frame, a heading slide reciprocably mounted within said bed frame and carrying a series of punches, a series of dies mounted upon said bed frame for co-operation with said punches, means for feeding elongated stock, means for cutting off lengths of stock and presenting the same to the first of said co-operating dies and punches, means for transferring the lengths of stock from one to another of said co-operating dies and punches, said punches operating to upset said lengths of stock to form headed blanks, said header slide being formed with an opening to receive the blanks operated upon by said punches and dies as said header slide approaches said series of dies, a passageway in said heading slide communicating with said opening and receiving and guiding a series of blanks, a pointing mechanism mounted on said bed frame, and means for removing blanks from said passageway and successively presenting the same to said pointing mechanism.

30. In a machine of the class described, a bed frame having a slideway formed therein, a crankshaft journalled in said bed frame and extending across said slideway, a header slide driven by said crankshaft and having opposed bearing portions bearing in said slideway on opposite sides of the crankshaft, a punch carried by one end of said header slide and arranged to co-operate with a die mounted on said bed frame, a roll threading die carried by said header slide on the opposite side of the crankshaft from said punch, a co-operating roll threading die mounted on said bed frame, and means for transferring blanks acted upon by said punch into position to be acted upon by said roll threading dies.

31. In a bolt making machine, a bed frame, a reciprocating heading slide mounted in said bed frame, a punch mounted on an end of said slide and a co-operating die carried by said bed frame, a reciprocating roll threading die mounted upon a side of said header, a co-operating roll threading die mounted on said bed frame, and means for transferring blanks acted upon by said punch and said first mentioned die to said roll threading dies.

32. In a bolt making machine, a bed frame, a reciprocating heading slide mounted in said bed frame, a punch mounted on an end of said slide and a co-operating die carried by said bed frame, a reciprocating roll threading die mounted upon a side of said header slide, a co-operating roll threading die slidably mounted upon said bed frame, and driven by said header slide in the opposite direction, and means for transferring blanks acted upon by said punch and said first mentioned die into position to be acted upon by said roll threading dies.

33. In a bolt making machine, a bed frame, a reciprocating header slide mounted in said bed frame, a punch mounted on said slide and a co-operating die carried by said bed frame, a reciprocating roll threading die mounted upon said slide, a co-operating roll threading die mounted on said bed frame, and means for presenting the blanks acted upon by said punch and said first mentioned die to said roll threading dies.

34. In a bolt making machine, a bed frame, a reciprocating slide, co-acting tools carried by said slide and said bed frame to act upon bolt blanks, means for successively presenting bolt blanks to said tools, a roll threading die carried by said slide and a co-operating roll threading die carried by said bed frame and means for presenting bolt blanks acted upon by said tools to said roll threading dies, said means and dies being arranged in such a manner that when said slide moves in one direction said tools act upon a blank and when said slide moves in the opposite direction said roll threading dies act upon a blank.

35. In a machine of the class described, a bed frame, a reciprocating header slide mounted in said bed frame, co-operating tools carried by an end of said header slide and by said bed frame for upsetting lengths of stock and producing blanks having heads and shanks, a reciprocating roll threading die mounted on said header slide, a co-operating roll threading die mounted on said bed frame, and means for transferring the headed blanks acted upon by said tools to said dies and means for positioning said blanks between said dies to roll threads on the shanks thereof.

36. In a bolt making machine, a bed frame, a reciprocating header slide mounted in said bed frame, a punch carried by said slide and a co-operating die mounted in said bed frame, a roll threading die carried by said slide, a co-operating roll threading die mounted on said bed frame, means for presenting blanks to said punch and die and means for transferring and presenting a blank acted upon by said punch and die to said roll threading dies during each portion of the movement of said slide resulting in the completion of the operation on a blank by said punch and co-operating die.

37. In a bolt making machine, a bed frame, a reciprocating slide therein, a pair of roll threading dies, one of which is driven by said slide, means for actuating said slide and threading die, co-operating tools on said slide and bed frame, means for presenting blanks in consecutive order to said tools to be acted upon thereby, a pointing mechanism, means for presenting the blanks acted upon by said tools to said pointing mechanism in the same consecutive order and means for presenting the pointed blanks to said roll threading dies in the same consecutive order.

38. A bolt making machine comprising a blank shaping mechanism including a bed frame, a reciprocating slide therein, co-operating tools on said slide and bed frame arranged to act upon blanks when said slide moves in one direction, means for presenting blanks to said tools to be acted upon thereby, a pair of roll threading dies, one of which is driven by said slide arranged to roll a thread upon a blank when said slide moves in the other direction, a pointing mechanism operatively connected to said first mechanism, means for presenting the blanks acted upon by said tools to said pointing mechanism to point the shanks thereof, and means for presenting the pointed blanks to said roll threading dies to roll threads on the shanks thereof in the same order in which the blanks are acted upon by said tools.

39. In a bolt making machine, in combination, a bed frame, a heading slide reciprocably mounted within said bed frame, means for reciprocating said heading slide, a plurality of co-operating dies and punches carried by said heading slide and bed frame, means for feeding elongated stock and means for cutting off lengths of said stock and presenting the same to the first of said co-operating dies and punches, said dies and punches including an extrusion die for reducing the diameter of the lengths of stock and means for upsetting the lengths of stock to form headed blanks, a pointing mechanism carried by said bed frame, a roll threading die mounted on said heading slide and a co-operating roll threading die mounted on said bed frame, means for transferring the headed and extruded blanks acted upon by said tools and punches to said pointing mechanism to point the shanks thereof, and means for transferring the pointed blanks to said roll threading dies and presenting the same to said dies in position to roll threads on the extruded and pointed shanks of said blanks.

40. In a machine of the class described, a bed frame having a die breast, a reciprocating slide mounted in said bed frame and movable toward and away from said die breast, cooperating tools carried by said slide and die breast arranged to act upon blanks, and said slide being formed with a passageway arranged to receive the blanks acted upon by said tools and formed to guide a series of the blanks, said passageway emerging from said slide at a point above the level of said tools.

41. In a machine of the class described, a reciprocating slide for working blanks having a passageway beginning at its working face arranged to receive and guide a series of blanks acted on by said slide and emerging through the upper surface of said slide.

42. A bolt making machine comprising, a bed frame, a reciprocating slide therein, co-operating tools on said slide and bed frame, a pointing mechanism, means for presenting blanks to said co-operating tools to be acted on thereby and means for presenting said blanks to said pointing tool in the same consecutive order in which said blanks are acted on, co-operating roll threading dies, means to present the blanks to the said roll threading dies in the same consecutive order in which said blanks are pointed.

43. In combination, three mechanisms for acting upon blanks, means for feeding a series of blanks to the first of said mechanisms, a conduit arranged to receive and guide headed blanks in longitudinal head-to-tail relationship, means for ejecting blanks from said first mechanism into said conduit, a track for suspending blanks by their heads arranged to receive blanks from said conduit and guide the same to the second of said mechanisms, and a second conduit for receiving and guiding headed blanks ejected from said second mechanism in head-to-tail relationship, and a second track for suspending blanks by their heads arranged to receive blanks from said second conduit and guide the same to the third of said mechanisms.

44. In combination, a pair of mechanisms for acting upon blanks, a conduit, means for ejecting headed blanks from one of said mechanisms and feeding the same into said conduit in longitudinal head-to-tail relationship, and means for slidably suspending blanks by their heads connecting said conduit with the other of said mechanisms and arranged to receive blanks from said conduit in sequence, support the same by their heads, and guide said blanks to said other mechanism.

45. In combination, co-operating tools for acting upon blanks, means for feeding blanks to said tools, apparatus for performing other operations upon headed blanks, a conduit, means for feeding headed blanks acted upon by said tools into said conduit longitudinally with the head of each blank arranged adjacent the end of the shank of another blank, and means for suspending blanks by their heads arranged to receive headed blanks from said conduit in sequence and guide the same to said apparatus.

46. A bolt making machine comprising a reciprocating header slide, a crank shaft to actuate said slide, a roll threading mechanism, said mechanism actuated by said crank shaft, means to convey blanks acted upon by said header slide and present said blanks to said mechanism in the same consecutive order in which they are acted upon by the header slide.

47. In a bolt making machine, a bed frame, a reciprocating slide therein, a pair of roll threading dies, means for actuating said slide and threading dies, co-operating tools on said slide and bed frame, means for presenting blanks in consecutive order to said tools to be acted upon thereby, a pointing mechanism fixed with respect to said slide, means for presenting the blanks acted upon by said tools to said pointing mechanism in the same consecutive order and means for presenting the pointed blanks to said roll threading dies in the same consecutive order.

48. The method of making a series of bolts from a length of stock material which comprises, shearing blanks from the stock, extruding a portion of the blanks and upsetting a head on the blanks, pointing the blanks in the same consecutive order in which they are extruded and upset and roll threading the extruded portion in the same order as they are pointed.

49. The method of making a series of bolts from a length of stock material which comprises shearing blanks from the stock material, working the blanks to form a head and shank portion, pointing the blanks in the same consecutive order in which they are worked and roll threading the blanks in the same consecutive order as they are worked and pointed.

50. The method of making a series of bolts from a length of stock material which comprises the shearing, extruding and upsetting of blanks from the stock material, delivering the blanks from the shearing, extruding and upsetting operation in a vertical position and in the same consecutive order as extruded and upset, pointing the blanks in this order and position and rolling threads upon the blanks in the same order.

51. The method of fabricating a series of bolts comprising, feeding a length of stock horizontally into a machine, shearing and working blanks from the stock in a horizontal position, ejecting the worked blanks horizontally, turning the ejected blanks to a vertical position and delivering the blanks to a pointer in the vertical position and in the same consecutive order as worked, pointing the blanks and conducting the blanks to a roll threader, presenting the blanks to the roll threader in a vertical position and in the same order as worked and pointed.

52. In combination, mechanism for trimming the heads and extruding and pointing the shanks of headed bolt blanks, a pair of roll threading dies for rolling threads on the extruded shanks of the blanks, and means for automatically sequentially transferring the trimmed, extruded and pointed blanks from said mechanism to a starting position between said roll threading dies including a length of track for suspending the blanks by their heads, said length of track being inclined downwardly at a sufficient angle to feed blanks therealong by gravity, and said track length during normal operation of said machine being but partially filled with blanks whereby to provide a variable storage of blanks between said mechanism and said dies without losing control of the blanks.

53. In combination, mechanism for working bolt blanks, a pair of roll threading dies for rolling threads on the worked blanks, means for automatically sequentially transferring the worked blanks from said mechanism to a starting position between said roll threading dies including a length of track for suspending the blanks by their heads, said length of track being inclined downwardly at a sufficient angle to feed blanks therealong by gravity, and said track during normal operation of said machine being but partially filled with blanks whereby to provide a variable storage of blanks between said mechanism and said dies without losing control of the blanks.

54. A pair of mechanisms to perform different fabricating operations upon bolt blanks, means to feed the blanks to the first of said mechanisms in sequence, means for automatically transferring blanks worked in said first mechanism to said second mechanism in the same successive order comprising a blank conductor having an upwardly inclined portion and a downwardly inclined portion joined to said first portion, means operatively connected to said first mechanism to force the blanks up said first inclined portion, said blanks being moved by gravity down said second inclined portion, said second inclined portion during the normal operation of the machine being but partially filled with blanks whereby to provide a variable storage of blanks between said mechanisms.

55. In combination, mechanism for extruding and pointing the shanks of headed bolt blanks, a pair of roll threading dies for rolling threads on the extruded shanks of the blanks, and means for automatically sequentially transferring the extruded and pointed blanks from said mechanism to a starting position between said roll threading dies including a length of track for suspending the blanks by their heads, said length of track being inclined downwardly at a sufficient angle to feed blanks therealong by gravity, and said track length during normal operation of said machine being but partially filled with blanks whereby to provide a variable storage of blanks between said mechanism and said dies without losing control of the blanks.

56. In combination, a pair of mechanisms for acting upon blanks, means for transferring headed blanks from one of said mechanisms to the other comprising a conduit, means for ejecting headed blanks from one of said mechanisms and feeding the same into said conduit in longitudinal head-to-tail relationship, and means for slidably suspending blanks by their heads connecting said conduit with the other of said mechanisms and arranged to receive blanks from said conduit in sequence, support the same by their heads, and guide said blanks to said other mechanism, said last named means comprising a length of track being inclined downwardly at a sufficient angle to feed blanks therealong by gravity, said track length during normal operation of said machine being but partially filled with blanks whereby to provide a variable storage of blanks between said mechanisms without losing control of the blanks.

57. In combination, a frame, a slide reciprocably mounted on said frame, co-operating dies and tools carried by said frame and slide for acting upon bolt blanks, a roll threading die mounted on said frame, a co-operating roll threading die mounted on said slide, and means to reciprocate one of said roll threading dies with respect to the member on which it is mounted in such a manner as to provide an effective stroke between said roll threading dies longer than the stroke of said slide, and means for feeding the blanks acted on by said dies and tools to said roll threading dies.

58. A bolt machine comprising a bed frame, a rotatably mounted crankshaft therein, a heading slide mounted in said bed frame, means operatively connecting said slide and crankshaft to effect header slide reciprocation in response to crankshaft rotation, co-operating tools carried by an end of said header slide and by said bed frame for acting upon bolt blanks and producing a headed bolt blank during each cycle of the movement of said header slide, means for feeding elongated stock into said machine, means for cutting off lengths of said stock to form bolt blanks and presenting said blanks to said co-operating tools, a pair of co-operating roll threading dies, means operatively connecting one of said roll threading dies with said crankshaft to effect reciprocation of said roll threading dies in timed relation with said crankshaft rotation and said heading slide reciprocation, the other of said roll threading dies mounted on said bed frame and means for transferring a headed blank acted upon by said co-operating header slide and bed frame tools to said thread rolling dies driving each cycle of the movement of said header slide so that one of said headed blanks is threaded by said pair of roll threading dies during each cycle of the movement of the header slide.

59. A unitary machine for acting upon bolt blanks comprising a main frame, a slide reciprocably mounted in said frame, means for reciprocating said slide, a trimming tool means carried by said slide and co-operating tool means carried by said frame to shape a polygonal head upon a bolt blank when said slide is reciprocated, means for presenting bolt blanks to said tool means, a pointing mechanism comprising a chuck for gripping and holding bolt blanks, a cutting tool for cutting a point upon the end of a blank held by said chuck, said chuck and cutting tool being relatively reciprocable to bring a blank held by the chuck into engagement with the cutting tool, and said chuck and cutting tool being relatively rotatable to cut the point, and means for transferring the bolt blanks from said trimming tool means to said pointing mechanism in the same consecutive order in which the blanks are trimmed, said pointing mechanism being timed with said reciprocating slide to point a blank during each cycle of movement of said slide and said transferring means being timed with respect to said reciprocating slide to present a blank to said pointing mechanism during each cycle of the movement of said slide.

EARL R. FROST.

CERTIFICATE OF CORRECTION.

Patent No. 2,020,658.    November 12, 1935.

EARL R. FROST.

It is hereby certified that error appears in the printed specification of the above numbered patent requiring correction as follows: Page 14, second column, line 3, claim 58, for "driving" read during; and that the said Letters Patent should be read with this correction therein that the same may conform to the record of the case in the Patent Office.

Signed and sealed this 28th day of January, A. D. 1936.

Leslie Frazer (Seal)    Acting Commissioner of Patents.

being but partially filled with blanks whereby to provide a variable storage of blanks between said mechanisms without losing control of the blanks.

57. In combination, a frame, a slide reciprocably mounted on said frame, co-operating dies and tools carried by said frame and slide for acting upon bolt blanks, a roll threading die mounted on said frame, a co-operating roll threading die mounted on said slide, and means to reciprocate one of said roll threading dies with respect to the member on which it is mounted in such a manner as to provide an effective stroke between said roll threading dies longer than the stroke of said slide, and means for feeding the blanks acted on by said dies and tools to said roll threading dies.

58. A bolt machine comprising a bed frame, a rotatably mounted crankshaft therein, a heading slide mounted in said bed frame, means operatively connecting said slide and crankshaft to effect header slide reciprocation in response to crankshaft rotation, co-operating tools carried by an end of said header slide and by said bed frame for acting upon bolt blanks and producing a headed bolt blank during each cycle of the movement of said header slide, means for feeding elongated stock into said machine, means for cutting off lengths of said stock to form bolt blanks and presenting said blanks to said co-operating tools, a pair of co-operating roll threading dies, means operatively connecting one of said roll threading dies with said crankshaft to effect reciprocation of said roll threading dies in timed relation with said crankshaft rotation and said heading slide reciprocation, the other of said roll threading dies mounted on said bed frame and means for transferring a headed blank acted upon by said co-operating header slide and bed frame tools to said thread rolling dies driving each cycle of the movement of said header slide so that one of said headed blanks is threaded by said pair of roll threading dies during each cycle of the movement of the header slide.

59. A unitary machine for acting upon bolt blanks comprising a main frame, a slide reciprocably mounted in said frame, means for reciprocating said slide, a trimming tool means carried by said slide and co-operating tool means carried by said frame to shape a polygonal head upon a bolt blank when said slide is reciprocated, means for presenting bolt blanks to said tool means, a pointing mechanism comprising a chuck for gripping and holding bolt blanks, a cutting tool for cutting a point upon the end of a blank held by said chuck, said chuck and cutting tool being relatively reciprocable to bring a blank held by the chuck into engagement with the cutting tool, and said chuck and cutting tool being relatively rotatable to cut the point, and means for transferring the bolt blanks from said trimming tool means to said pointing mechanism in the same consecutive order in which the blanks are trimmed, said pointing mechanism being timed with said reciprocating slide to point a blank during each cycle of movement of said slide and said transferring means being timed with respect to said reciprocating slide to present a blank to said pointing mechanism during each cycle of the movement of said slide.

EARL R. FROST.

---

CERTIFICATE OF CORRECTION.

Patent No. 2,020,658.                                November 12, 1935.

EARL R. FROST.

It is hereby certified that error appears in the printed specification of the above numbered patent requiring correction as follows: Page 14, second column, line 3, claim 58, for "driving" read during; and that the said Letters Patent should be read with this correction therein that the same may conform to the record of the case in the Patent Office.

Signed and sealed this 28th day of January, A. D. 1936.

Leslie Frazer (Seal)                                        Acting Commissioner of Patents.